United States Patent
Ramesh et al.

(10) Patent No.: US 11,907,433 B2
(45) Date of Patent: Feb. 20, 2024

(54) GESTURE-BASED SYSTEMS AND METHODS FOR AIRCRAFT CABIN LIGHT CONTROL

(71) Applicant: GOODRICH CORPORATION, Charlotte, NC (US)

(72) Inventors: Vijay Ramesh, Hiawatha, IA (US); Harish B Jayaraj, Hyderabad (IN); Deepak Khanduri, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/688,491

(22) Filed: Mar. 7, 2022

(65) Prior Publication Data

US 2022/0404913 A1 Dec. 22, 2022

(30) Foreign Application Priority Data

Jun. 21, 2021 (IN) .............................. 202111027663

(51) Int. Cl.
*G06F 3/00* (2006.01)
*G06F 3/01* (2006.01)
*G06V 40/20* (2022.01)
*B64D 11/00* (2006.01)
(Continued)

(52) U.S. Cl.
CPC ........ *G06F 3/017* (2013.01); *B64D 11/00155* (2014.12); *B64D 11/0606* (2014.12); *G06V 40/113* (2022.01); *G06V 40/28* (2022.01); *B64D 2011/0053* (2013.01)

(58) Field of Classification Search
CPC .............. G05B 19/042; G05B 19/0426; G05B 2219/23021; G05B 2219/2642; G05B 2219/32335; G05B 2219/37572; G06F 3/017; G06F 21/32; G06F 3/011; G06F 3/0233; G06F 3/0236; G06F 3/0482; G06F 40/274; G06F 21/35; G06F 3/044;
(Continued)

(56) References Cited

U.S. PATENT DOCUMENTS

| 9,037,354 B2 * | 5/2015 | Mondragon ............. G09G 5/00 |
| | | 701/48 |
| 10,112,716 B2 | 10/2018 | Gagnon et al. |
| 10,144,512 B2 | 12/2018 | Gagnon et al. |

(Continued)

OTHER PUBLICATIONS

European Patent Office, European Search Report dated Nov. 10, 2022 in Application No. 22177884.8.

*Primary Examiner* — Rayeez R Chowdhury
(74) *Attorney, Agent, or Firm* — SNELL & WILMER L.L.P.

(57) ABSTRACT

A method of touchless activation of an electrically activated device may comprise: receiving, via a processor and through a sensor in an aircraft cabin, gesture data; comparing, via the processor, the gesture data to a predetermined gesture, the predetermined gesture being created by transitioning a hand from a first position to a second position, one of the first position and the second position being a closed fist, a remainder of the first position and the second position being an open palm; determining, via the processor, whether the gesture data matches the predetermined gesture; and commanding, via the processor, the electrically activated device to change from a first state to a second state.

19 Claims, 6 Drawing Sheets

(51) Int. Cl.
*B64D 11/06* (2006.01)
*G06V 40/10* (2022.01)

(58) Field of Classification Search
CPC ...... G06F 3/0443; G06F 3/045; G06F 3/0487; G06N 3/02
See application file for complete search history.

(56) References Cited

U.S. PATENT DOCUMENTS

| | | |
|---|---|---|
| 10,372,231 B2 | 8/2019 | Schalla et al. |
| 2006/0209021 A1* | 9/2006 | Yoo ........................ G06F 3/0304 345/156 |
| 2009/0109036 A1* | 4/2009 | Schalla .............. B64D 11/0626 382/209 |
| 2009/0112638 A1* | 4/2009 | Kneller .................. G06Q 10/00 705/5 |
| 2013/0328763 A1 | 12/2013 | Latta |
| 2014/0198031 A1* | 7/2014 | Xiong .................. G06V 40/113 382/103 |
| 2016/0224123 A1 | 8/2016 | Antoniac et al. |
| 2017/0099716 A1* | 4/2017 | Kataoka ................... F21V 14/02 |
| 2018/0136733 A1* | 5/2018 | Schalla ............ B64D 11/00151 |
| 2019/0073043 A1* | 3/2019 | Schalla ............. B64D 11/0015 |
| 2020/0110928 A1* | 4/2020 | Al Jazaery ........... G05B 19/042 |
| 2022/0415162 A1* | 12/2022 | Netzler .................. G08C 17/02 |

\* cited by examiner

GESTURE-BASED SYSTEMS AND METHODS FOR AIRCRAFT CABIN LIGHT CONTROL

CROSS-REFERENCE TO RELATED APPLICATIONS

This application is a non-provisional of, and claims priority to, and the benefit of India Provisional Application No. 202111027663 with DAS Code B67B, entitled "GESTURE-BASED SYSTEMS AND METHODS FOR AIRCRAFT CABIN LIGHT CONTROL," filed on Jun. 21, 2021, which is hereby incorporated by reference in its entirety for all purposes.

FIELD

The present disclosure relates generally to gesture-based systems and methods and, more particularly, to gesture based systems and methods that are touchless in an aircraft cabin.

BACKGROUND

The recent novel-coronavirus (SARS-COV-2) outbreak has negatively impacted the safety and health of many people. Pathogens can be transmitted via direct airborne transmission between users or via indirect contact transmission from different users occupying the same space at different times. For example, lingering pathogens may remain on contact surfaces of an aircraft cabin to be spread to passengers and/or crew members on a subsequent flight. The safety of passengers and crew members may be improved by implementing touchless features in aircraft cabins, such as gesture based systems and methods.

SUMMARY

A method of touchless activation of an electrically activated device is disclosed herein. The method may comprise: receiving, via a processor and through a sensor in an aircraft cabin, gesture data; comparing, via the processor, the gesture data to a predetermined gesture, the predetermined gesture being created by transitioning a hand from a first position to a second position, one of the first position and the second position being a closed fist, a remainder of the first position and the second position being an open palm; determining, via the processor, whether the gesture data matches the predetermined gesture; and commanding, via the processor, the electrically activated device to change from a first state to a second state.

In various embodiments, the method further comprises polling, via the processor, the gesture data. The method may further comprise testing a confidence level of the gesture data matching the predetermined gesture. Testing the confidence level of the gesture data matching the predetermined gesture may include determining a probability the gesture data matches the predetermined gesture. The confidence level may be greater than 80%. The predetermined gesture may further comprise fingers of a user being spread apart and extended distally to the open palm. The sensor may be a motion sensor.

A gesture-based system is disclosed herein. The gesture-based system may comprise: an armrest in an aircraft cabin; a sensor coupled to the armrest and oriented orthogonal to a ground surface in the aircraft cabin; a controller in operable communication with the sensor, the controller configured to: receive, via a processor and through the sensor, gesture data; compare, via the processor, the gesture data to a predetermined gesture, the predetermined gesture being created by transitioning a hand from a first position to a second position; determine, via the processor, whether the gesture data matches the predetermined gesture; and command, via the processor, an electrically activated device to change from a first state to a second state.

In various embodiments, one of the first position and the second position is a closed fist, and a remainder of the first position and the second position is an open palm. The predetermined gesture may further comprise fingers of a user being spread apart. The gesture-based system may further comprise the electrically activated device in operable communication with the controller, the electrically activated device configured to transition from the first state to the second state in response to the command. The gesture-based system may further comprise a passenger service unit (PSU), the controller in operable communication with the PSU. The controller may be further configured to test a confidence level of the gesture data matching the predetermined gesture. Testing the confidence level of the gesture data matching the predetermined gesture may include determining a probability the gesture data matches the predetermined gesture, wherein the gesture data matches the predetermined gesture in response to the probability being greater than 80%.

An article of manufacture is disclosed herein. The article of manufacture may include a tangible, non-transitory computer-readable storage medium having instructions stored thereon that, in response to execution by a processor, cause the processor to perform operations comprising: receiving, via the processor and through a sensor in an aircraft cabin, gesture data; comparing, via the processor, the gesture data to a predetermined gesture, the predetermined gesture being created by transitioning a hand from a first position to a second position, one of the first position and the second position being a closed fist, a remainder of the first position and the second position being an open palm; determining, via the processor, whether the gesture data matches the predetermined gesture; and commanding, via the processor, an electrically activated device to change from a first state to a second state.

In various embodiments, the operations further comprise testing a confidence level of the gesture data matching the predetermined gesture. Testing the confidence level of the gesture data matching the predetermined gesture may include determining a probability the gesture data matches the predetermined gesture. The predetermined gesture may further comprise fingers of a user being spread apart. The operations may further comprise polling, via the processor, the gesture data. The sensor may comprise a motion sensor.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings

DETAILED DESCRIPTION

Figure 1:
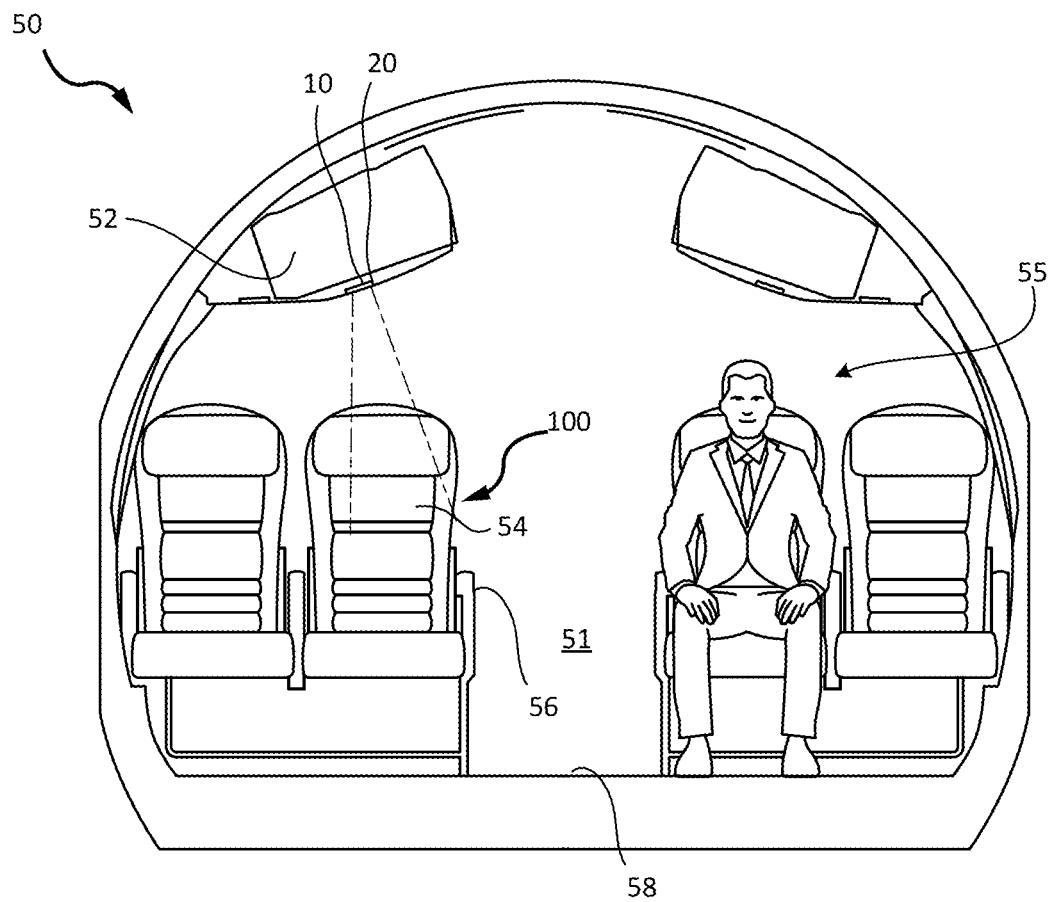
FIG. 1 illustrates an aircraft cabin having a gesture-based system, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Lights inside aircraft cabins are currently controlled by switches placed on arm rest or on the passenger electronic devices (PEDs) or touch screen interface available. Passengers use the light functionality very frequently, and every time they are dependent on touch interfaces to turn the lights on or off. Common touch interfaces are potential risk for contracting diseases. Typical gesture-based systems today utilize touch based interfaces to set up respective gestures for a given passenger. In this regard, typical gesture-based systems and methods still have passengers touch surfaces, such as PEDs or the like. Passengers may be provided an alternative to control the lights inside the cabin (seats) from the regular touch interfaces. Passengers in luxury aircrafts also would like to interact with the latest of technologies inside their aircraft cabin, and gesture based controls are suitable for application in aircraft cabins.

A typical Cabin Management System uses touch based controls to turn cabin lights on and off or open and close window shades. The interfaces are provided as physical touch switches near the armrest area or are controllable through user interface (UIs) provided on PEDs. The Passenger often navigates between multiple pages through the cabin management applications to access the light controls.

Disclosed herein are gesture-based systems and methods to control various functions of a cabin management system. In various embodiments, the gesture-based systems and methods disclosed herein are entirely touchless. In this regard, passengers may be at lower risk of coming in contact with pathogens, such as viruses or bacteria, during a respective flight, in accordance with various embodiments. Current gesture-based systems are convoluted and utilize touch-based systems to set up a respective gesture-based application. In this regard, the gesture-based system disclosed herein allows for an entirely touchless experience for a passenger, in accordance with various embodiments.

In various embodiments, the gesture-based system disclosed herein comprises a sensor disposed proximate a seat in an aircraft cabin. In various embodiments, the sensor is in communication with a controller. The controller may be in communication with an electrically activated device, such as a reading light, or a shade in an aircraft cabin. In various embodiments, in response to the sensor detecting a predetermined gesture, the controller may send an electrical signal to the electrically activated device to activate the electrically activated device, in accordance with various embodiments.

With reference to FIG. 1, a cabin 51 of an aircraft 50 is shown, according to various embodiments. The aircraft 50 may be any aircraft such as an airplane, a helicopter, or any other aircraft. The aircraft 50 may include passenger service units (PSUs) 10 that control various functions for passengers 55 in the cabin 51. Pathogens, such as viruses and bacteria, may remain on surfaces of the cabin 51, and these remaining pathogens may result in indirect contact transmission to other people (e.g., subsequent passengers). For example, the cabin 51 may include overhead bins 52, passenger seats 54 for supporting passengers 55, armrest 56, lavatory surfaces, PEDs, and other structures/surfaces upon which active pathogens may temporarily reside. As will be discussed further below, in order to reduce the transmission/transfer of pathogens between passengers, the cabin 51 may further comprise a gesture-based system 100 for controlling an electrically activated device, such as a reading light 20, a shade, or the like.

Figure 2:
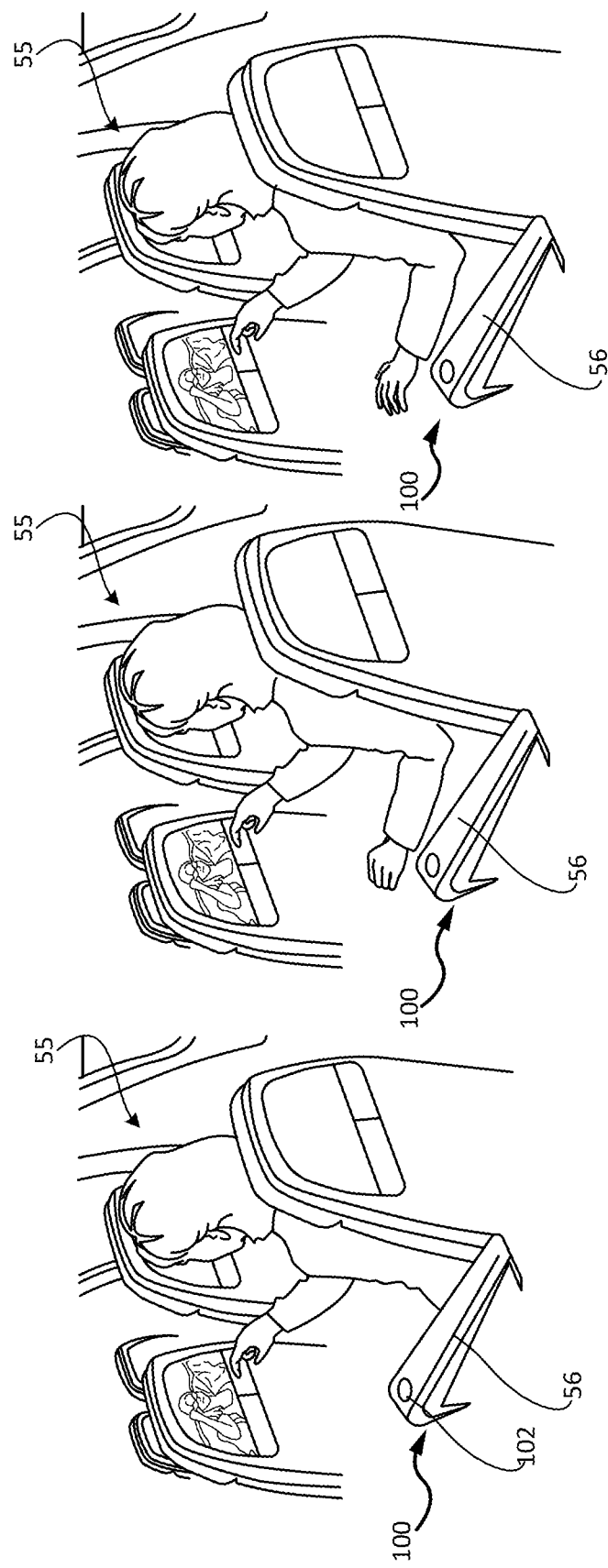
FIG. 2A illustrates a gesture-based system in an aircraft cabin prior to use, in accordance with various embodiments.
FIG. 2B illustrates the gesture-based system of FIG. 2A during use, in accordance with various embodiments.
FIG. 2C illustrates the gesture-based system of FIG. 2A during use, in accordance with various embodiments.

Referring now to FIGS. 2A, 2B, and 2C, a gesture-based system 100 in use in a cabin 51 from FIG. 1 is illustrated, in accordance with various embodiments. In various embodiments, the gesture-based system 100 comprises a sensor 102. In various embodiments, the sensor may be a motion detection sensor comprising a first camera, a second camera, and a plurality of infrared light emitting diodes (LEDs). Although described as comprising cameras and LEDs, the present disclosure is not limited in this regard. For example, the sensor may comprise any motion detection sensor. In various embodiments, the sensor 102 may be disposed on an armrest 56 and oriented in a vertically upward direction (i.e., approximately perpendicular to a ground surface 58 in the aircraft cabin 51 from FIG. 1.

With reference now to FIGS. 2B and 2C, a passenger 55 may utilize the gesture-based system 100 to activate a respective feature within the aircraft cabin 51 from FIG. 1. For example, the gesture-based system 100 may be configured to turn a reading light on or off, to open or close a shade, or the like. In various embodiments, the passenger 55 may hover his or her hand over the sensor 102 from FIG. 2A, the hand being in a predetermined initial position (e.g., a closed fist). A "gesture" as described herein is a predetermined motion of a hand and/or fingers. In various embodiments, to activate an electrically activated device of the gesture based system (e.g., a reading light, a shade, or the like), the passenger 55 may transition his hand from the predetermined initial position to a predetermine post position (e.g., an open hand) to form a predetermined gesture. In various embodiments, the sensor 102 is configured to detect the predetermined gesture and activate the electrically activated device as described further herein. In various embodiments, the gesture-based system 100 may allow the passenger 55 to turn a reading light on or off, open or close a shade, or the like in an entirely touchless fashion without interacting with any devices or surfaces.

Figure 5B:
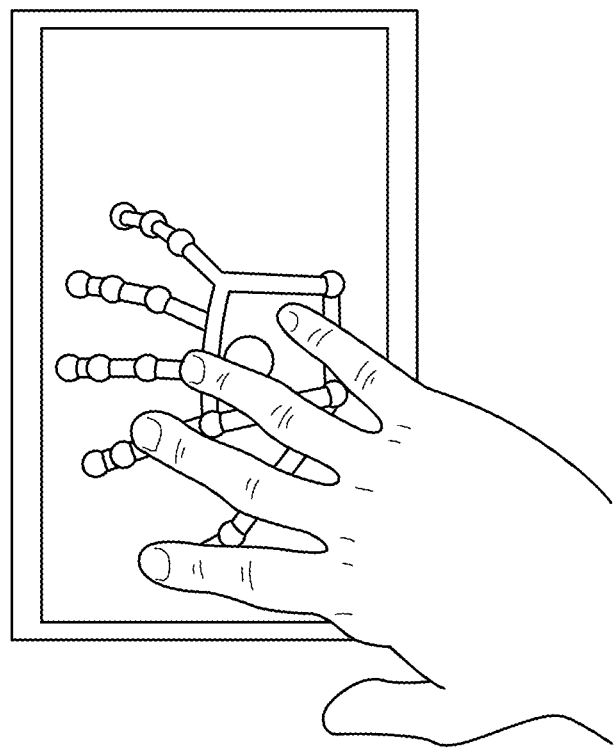
FIG. 5B illustrates a final state of the predetermined gesture of FIG. 5A, in accordance with various embodiments.
Figure 5A:
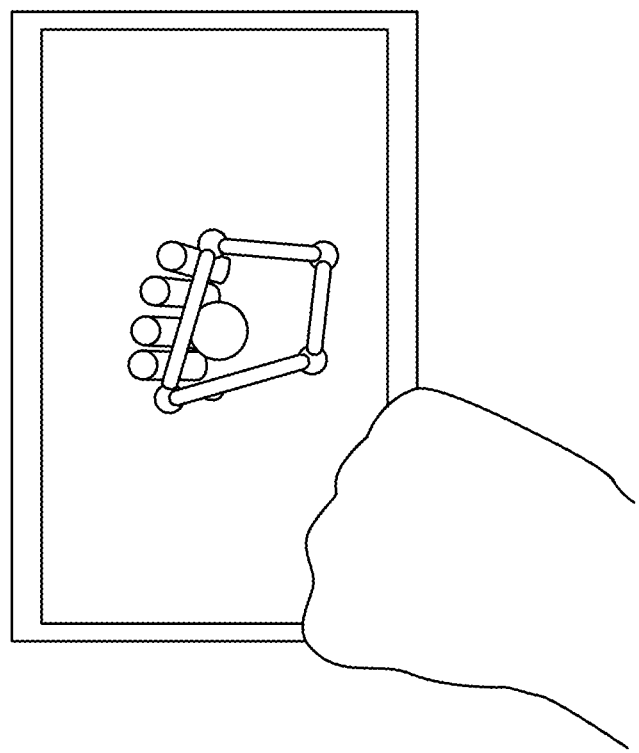
FIG. 5A illustrates an initial state of a predetermined gesture of a gesture based system, in accordance with various embodiments.

With brief reference to FIGS. 5A and 5B, a predetermined gesture is illustrated in an initial state (FIG. 5A) and a final state (FIG. 5B), in accordance with various embodiments. In various embodiments, the initial state of FIG. 5A may comprise a closed fist and the final state may comprise an open hand with fingers spread apart. In various embodiments, having a predetermined gesture as described herein may be easier to track relative to gestures in other gesture based systems. For example, the transition between the initial state (FIG. 5A) and the final state (FIG. 5B) result in a significant change of density of where the object (e.g., the hand) is relative to the sensor. The fingers extend outward from the central object (e.g., the palm). Thus, the predetermined gesture described herein may result in fewer false detections relative to typical gesture based systems. Additionally, the predetermined gesture may be easy to utilize on an armrest 56 from FIGS. 1-2C. For example, a user simply has to place his or her fist towards the sensor 102 and open his or her hand. Although described herein as transitioning from closed fist (FIG. 5A) to open hand (FIG. 5B), the predetermined gesture could also transition from open hand (FIG. 5B) to closed fist (FIG. 5A) in accordance with various embodiments. In various embodiments, transitioning from FIG. 5A to FIG. 5B may be configured to transition an electrically activated device 108 from a first state (e.g., off) to a second state (e.g., on) and transitioning from FIG. 5B to FIG. 5A may be configured to transition the electrically activated device 108 from the second state (e.g., on) to the first state (e.g., off).

Figure 3:
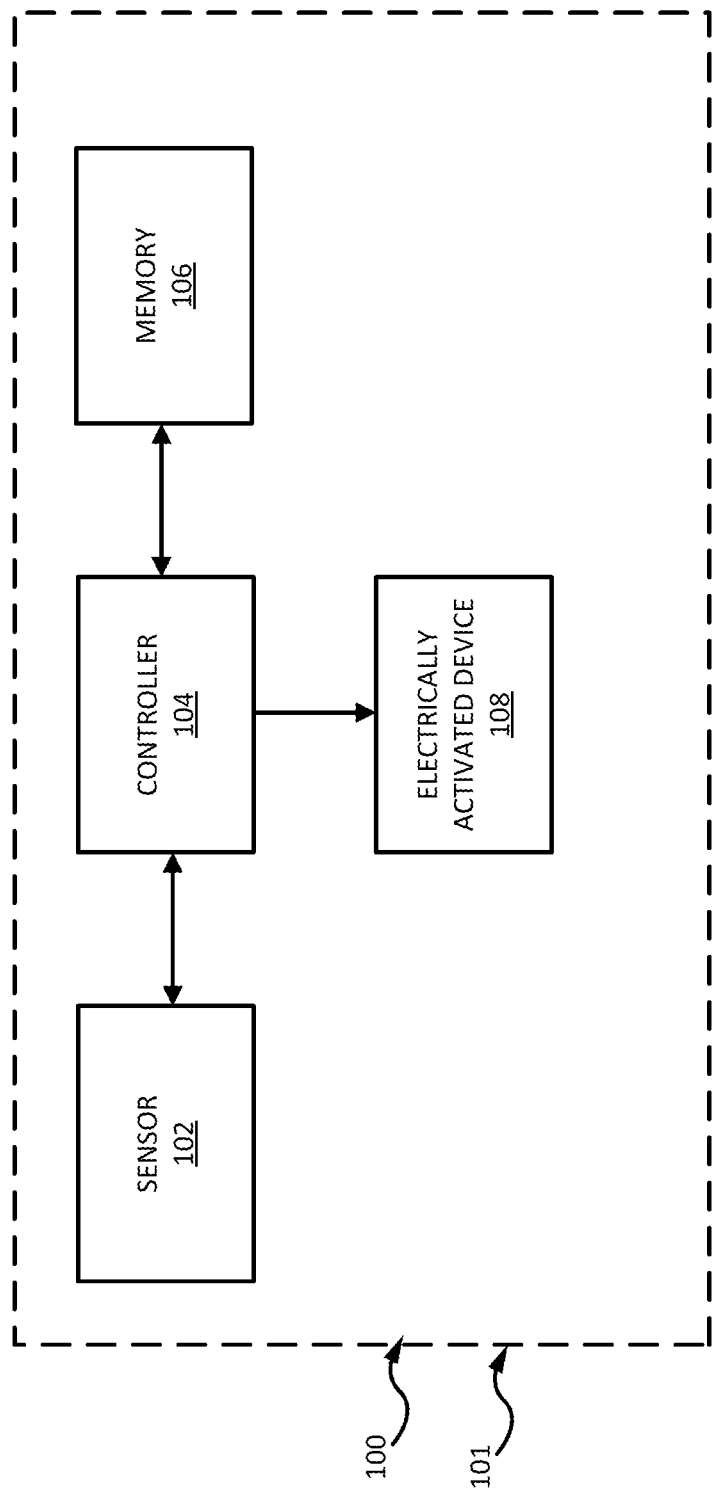
FIG. 3 illustrates a control system for a gesture-based system, in accordance with various embodiments.

Referring now to FIG. 3, a schematic view of a control system 101 for a gesture-based system 100 is illustrated, in accordance with various embodiments. The control system 101 comprises a controller 104, a memory 106, the sensor 102, and an electrically activated device 108 (e.g., a reading light, a shade, or a like).

The control system 101 includes the controller 104 and the memory 106 (e.g., a database or any appropriate data structure; hereafter "memory 106" also may be referred to as "database 106"). The controller 104 may include one or more logic devices such as one or more of a central processing unit (CPU), an accelerated processing unit (APU), a digital signal processor (DSP), a field programmable gate array (FPGA), an application specific integrated circuit (ASIC), or the like (e.g., controller 104 may utilize one or more processors of any appropriate type/configuration, may utilize any appropriate processing architecture, or both). In various embodiments, the controller 104 may further include any non-transitory memory known in the art. The memory 106 may store instructions usable by the logic device to perform operations. Any appropriate computer-readable type/configuration may be utilized as the memory 106, any appropriate data storage architecture may be utilized by the memory 106, or both.

The database 106 may be integral to the control system 101 or may be located remote from the control system 101. The controller 104 may communicate with the database 106 via any wired or wireless protocol. In that regard, the controller 104 may access data stored in the database 106. In various embodiments, the controller 104 may be integrated into computer systems within the aircraft cabin 51 from FIG. 1. Furthermore, any number of conventional techniques for electronics configuration, signal processing and/or control, data processing and the like may be employed. Also, the processes, functions, and instructions may can include software routines in conjunction with processors, etc.

System program instructions and/or controller instructions may be loaded onto a non-transitory, tangible computer-readable medium having instructions stored thereon that, in response to execution by the processor, cause the controller 104 to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the sensor 102 is in operable communication with the controller 104. Similarly, the controller 104 is in operable communication with the electrically activated device 108. In various embodiments, the sensor 102 is configured to detect motion and send motion data to the controller. In various embodiments, the controller 104 may compare the motion data to a predetermined gesture as described further herein.

Figure 4:
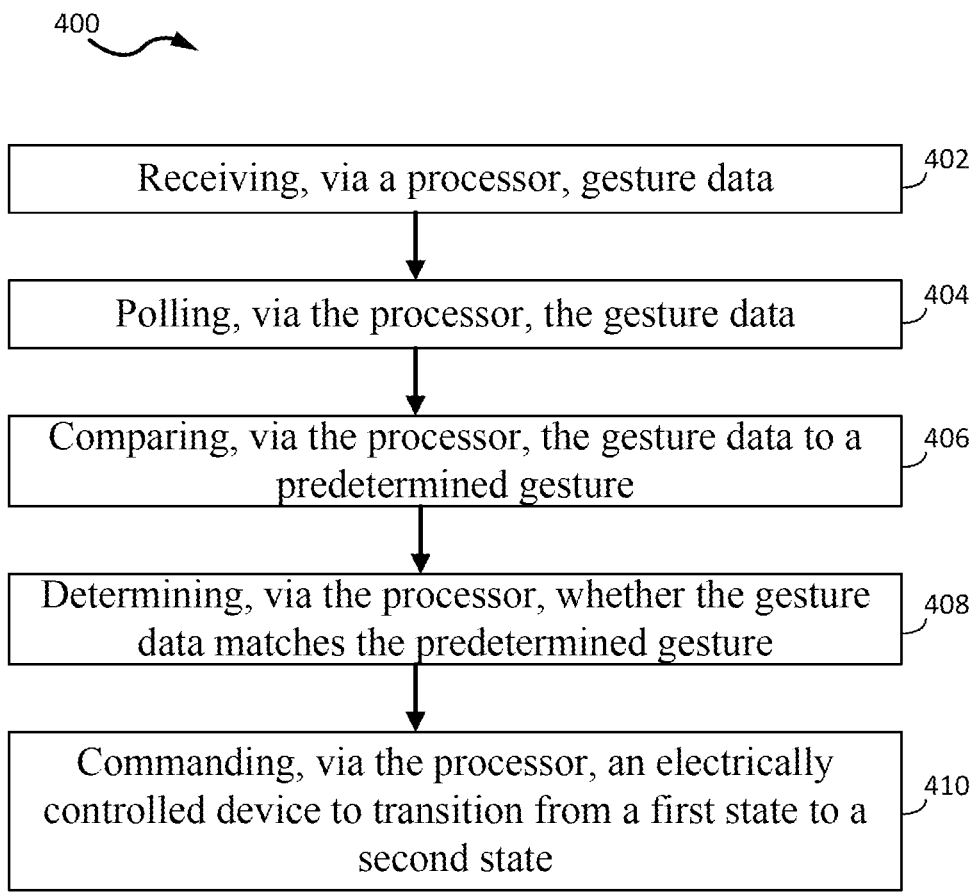
FIG. 4 illustrates a method of using a gesture-based system, in accordance with various embodiments.

Referring now to FIG. 4, a method 400 of using a control system 101 for a gesture-based system 100 is illustrated, in accordance with various embodiments. In various embodiments, the method 400 comprises receiving, via a processor and through a sensor 102, gesture data from a user (e.g., passenger 55 from FIGS. 1-2C) (step 402). The method further comprises polling, via the processor, the gesture data (step 404). In this regard, the processor is configured to track a gesture from an initial position to a final position, in accordance with various embodiments.

In various embodiments, the method 400 further comprises comparing, via the processor, the gesture data to a predetermined gesture (step 406).

In various embodiments, the method 400 further comprises determining, via the processor, whether the gesture data matches the predetermined gesture (step 406). In various embodiments, determining whether the gesture data matches the predetermined gesture may comprise testing the confidence of the gesture. In this regard, the control system 101 of the gesture-based system 100 may ensure to some statistical degree of confidence that the gesture is the predetermined gesture and not a random gesture. In various embodiments, the confidence level may be at least 80% similar, or at least 90% similar, or at least 95% similar, in accordance with various embodiments. "Similar" as described herein refers to a probability that the gesture data corresponds to the predetermined gesture. In this regard, various ways of performing the predetermined gesture may be tested to a statistically relevant degree and a probability distribution may be determined. In various embodiments, the probability distribution may be utilized in determining the confidence level meets a predetermined confidence level.

In various embodiments, the method 400 further comprises commanding, via the processor, an electrically activated device 108 to transition from a first state (e.g. off) to a second state (e.g., on) (step 410) in response to determining the gesture data matches the predetermined gesture. In various embodiments, the processor may command the electrically activated device through a controller of a respective PSU, or directly to the electrically activated device 108.

Figure 6:
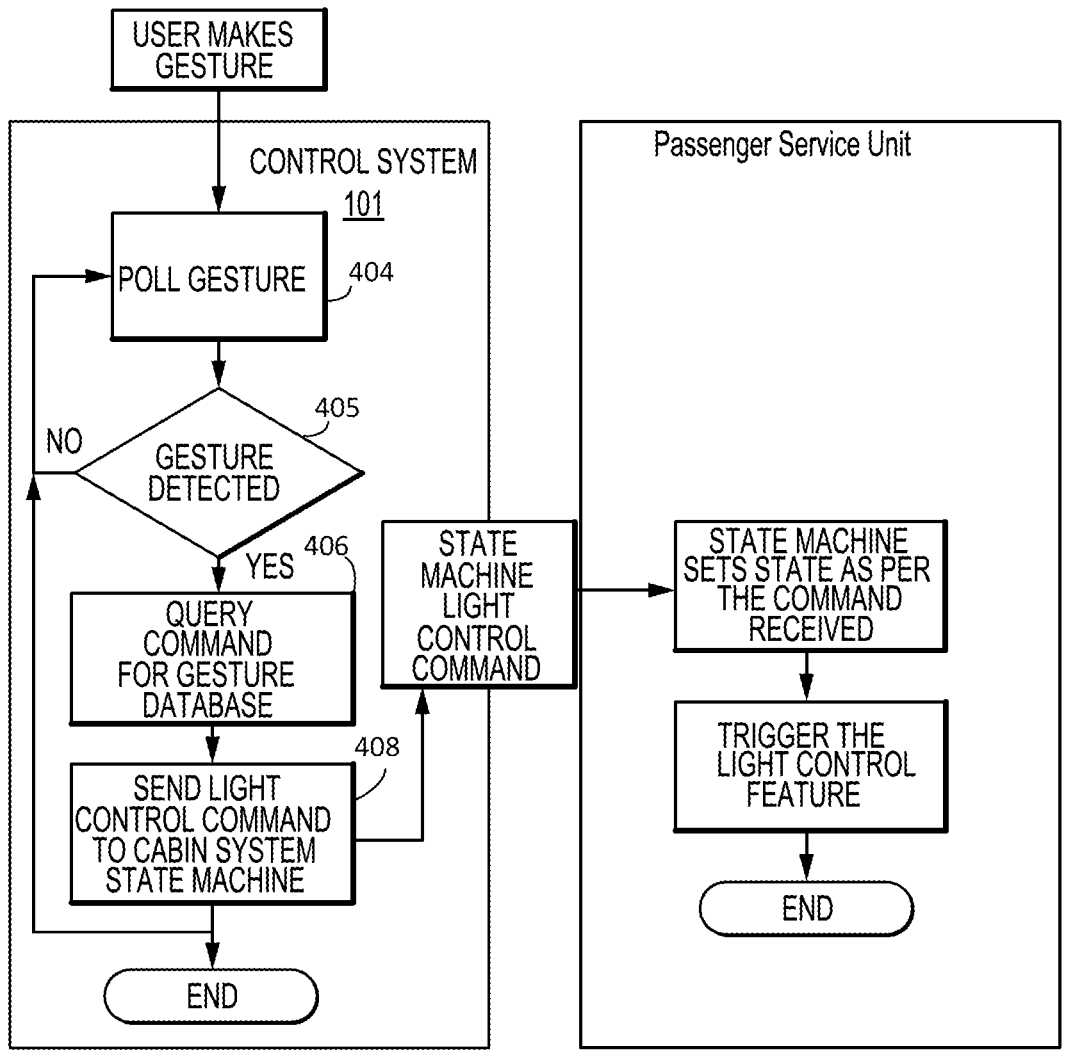
FIG. 6 illustrates a flow chart of the control system from FIG. 3, in accordance with various embodiments.

Referring now to FIG. 6, a flow chart of a gesture-based system 100 with method 400 from FIG. 4 is illustrated in accordance with various embodiments. In various embodiments, prior to comparing the gesture data to a predetermined gesture, the processor of control system 101 may check whether a gesture is even detected (step 405). In this regard, the process of control system 101 may stop at step 405 in response to a user just placing their hand over the sensor when using an arm rest to rest their arm, in accordance with various embodiments. In various embodiments, multiple gestures may be within a command for gesture database of step 406. In this regard, the processor may compare the gesture data to multiple predetermined gestures associated with differing commands, in accordance with various embodiments.

In various embodiments, in response to the processor sending a command to the electrically activated device to transition from a first state to a second state, a state machine for a respective cabin system or PSU 10 from FIG. 1 may transition the electrically activated device 108 from FIG. 3 from the first state to the second state.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of touchless activation of an electrically activated device, comprising:
   receiving, via a processor and through a sensor in an armrest of a seat in an aircraft cabin of an aircraft, exclusively touchless gesture data from a user, wherein the touchless gesture data is a first and only data received from the user;
   comparing, via the processor, the touchless gesture data to a predetermined gesture, the predetermined gesture being created by transitioning a hand from a first position to a second position, wherein if the first position is a closed fist, the second position is an open palm, and wherein if the first position is the open palm, the second position is the closed fist;
   determining, via the processor, whether the touchless gesture data matches the predetermined gesture; and
   commanding, via the processor, the electrically activated device to change from a first state to a second state.

2. The method of claim 1, further comprising polling, via the processor, the touchless gesture data.

3. The method of claim 1, further comprising testing a confidence level of the touchless gesture data matching the predetermined gesture.

4. The method of claim 3, wherein testing the confidence level of the touchless gesture data matching the predetermined gesture includes determining a probability the touchless gesture data matches the predetermined gesture.

5. The method of claim 4, wherein the confidence level is greater than 80%.

6. The method of claim 1, wherein the predetermined gesture further comprises fingers of the user being spread apart and extended distally from the open palm.

7. The method of claim 1, wherein the sensor is a motion sensor.

8. A gesture-based system, comprising:
an armrest in an aircraft cabin of an aircraft;
a sensor coupled to the armrest and oriented orthogonal to a ground surface in the aircraft cabin;
a controller in operable communication with the sensor, the controller configured to:
receive, via a processor and through the sensor, exclusively touchless gesture data from a user, wherein the touchless gesture data is a first and only data received from the user;
compare, via the processor, the touchless gesture data to a predetermined gesture, the predetermined gesture being created by transitioning a hand from a first position to a second position, wherein if the first position is a closed fist, the second position is an open palm, and wherein if the first position is the open palm, the second position is the closed fist;
determine, via the processor, whether the touchless gesture data matches the predetermined gesture; and
command, via the processor, an electrically activated device to change from a first state to a second state, wherein the gesture-based system is configured to allow a passenger to activate the electrically activated device in an entirely touchless fashion.

9. The gesture-based system of claim 8, wherein the predetermined gesture further comprises fingers of the user being spread apart.

10. The gesture-based system of claim 8, further comprising the electrically activated device in operable communication with the controller, the electrically activated device configured to transition from the first state to the second state in response to the command.

11. The gesture-based system of claim 8, further comprising a passenger service unit (PSU), the controller in operable communication with the PSU.

12. The gesture-based system of claim 8, wherein the controller is further configured to test a confidence level of the touchless gesture data matching the predetermined gesture.

13. The gesture-based system of claim 12, wherein testing the confidence level of the touchless gesture data matching the predetermined gesture includes determining a probability the touchless gesture data matches the predetermined gesture, wherein the touchless gesture data matches the predetermined gesture in response to the probability being greater than 80%.

14. An article of manufacture including a tangible, non-transitory computer-readable storage medium having instructions stored thereon that, in response to execution by a processor, cause the processor to perform operations comprising:
receiving, via the processor and through a sensor in an armrest of a seat in an aircraft cabin, exclusively touchless gesture data from a user, wherein the touchless gesture data is a first and only data received from the user;
comparing, via the processor, the touchless gesture data to a predetermined gesture, the predetermined gesture being created by transitioning a hand from a first position to a second position, wherein if the first position is a closed fist, the second position is an open palm, and wherein if the first position is the open palm, the second position is the closed fist;
determining, via the processor, whether the touchless gesture data matches the predetermined gesture; and
commanding, via the processor, an electrically activated device to change from a first state to a second state.

15. The article of manufacture of claim 14, wherein the operations further comprise testing a confidence level of the touchless gesture data matching the predetermined gesture.

16. The article of manufacture of claim 15, wherein testing the confidence level of the touchless gesture data matching the predetermined gesture includes determining a probability the touchless gesture data matches the predetermined gesture.

17. The article of manufacture of claim 14, wherein the predetermined gesture further comprises fingers of the user being spread apart.

18. The article of manufacture of claim 14, wherein the operations further comprise polling, via the processor, the touchless gesture data.

19. The article of manufacture of claim 14, wherein the sensor comprises a motion sensor.

* * * * *